(12) United States Patent
Crondahl

(10) Patent No.: US 12,071,786 B2
(45) Date of Patent: Aug. 27, 2024

(54) DOOR HANDLE RATE CONTROLLER

(71) Applicant: Westmill Industries Ltd., Aldergrove (CA)

(72) Inventor: Michael Arthur Crondahl, Mission (CA)

(73) Assignee: Westmill Industries Ltd., Abbotsford (CA)

( * ) Notice: Subject to any disclaimer, the term of this patent is extended or adjusted under 35 U.S.C. 154(b) by 663 days.

(21) Appl. No.: 17/240,477

(22) Filed: Apr. 26, 2021

(65) Prior Publication Data

US 2022/0341212 A1 Oct. 27, 2022

(51) Int. Cl.
| | |
|---|---|
| E05B 1/00 | (2006.01) |
| F16F 9/19 | (2006.01) |
| F16F 9/54 | (2006.01) |
| F16M 13/02 | (2006.01) |
| F26B 25/00 | (2006.01) |

(52) U.S. Cl.
CPC ............. *E05B 1/0053* (2013.01); *F16F 9/19* (2013.01); *F16F 9/54* (2013.01); *F16M 13/02* (2013.01); *F26B 25/009* (2013.01); *E05Y 2999/00* (2024.05); *F16F 2222/12* (2013.01); *F16F 2230/0005* (2013.01); *F16F 2232/08* (2013.01); *F16F 2234/02* (2013.01)

(58) Field of Classification Search
CPC ........ F26B 25/009; E05B 1/0053; F16F 9/19; F16F 9/54; F16F 2222/12; F16F 2230/0005; F16F 2232/08; F16F 2234/02; F16M 13/02; E05Y 2900/602

USPC .......................................................... 34/571
See application file for complete search history.

(56) References Cited

U.S. PATENT DOCUMENTS

| 64,463 A | 5/1867 | Wallace |
|---|---|---|
| 172,526 A | 1/1876 | Turner |
| 4,302,887 A | 12/1981 | Johnson |

(Continued)

FOREIGN PATENT DOCUMENTS

| CN | 201326334 Y | 10/2009 |
|---|---|---|
| CN | 202544609 U | 11/2012 |

(Continued)

*Primary Examiner* — Stephen M Gravini
(74) *Attorney, Agent, or Firm* — Oyen Wiggs Green & Mutala LLP

(57) ABSTRACT

A door handle rate controller is disclosed. The door handle rate controller includes a damper assembly operatively connected to a door handle such that a movement of the door handle is dampened. The damper assembly may be a piston and cylinder type damper having a piston and a piston rod mounted within a body for reciprocal movement in the body along its longitudinal axis. The damper assembly extends longitudinally from a damper head to an end of the piston rod. A handle side mount and a mounting bracket may be provided to secure the damper assembly to a first and second portion of the door handle. The handle side mount has a first housing bracket pivotally coupled to the end of the piston rod, and a second housing bracket arranged to pivotally couple to the first portion of the door handle. The mounting bracket is defined by an first opening arranged to receive the damper head, and a second opening arranged to receive the second portion of the door handle. The mounting bracket is pivotally coupled to the damper head.

18 Claims, 8 Drawing Sheets

(56) References Cited

U.S. PATENT DOCUMENTS

| | | | |
|---|---|---|---|
| 4,922,660 A | | 5/1990 | Omelchuk |
| 4,964,228 A | | 10/1990 | Coffman |
| 5,579,952 A | * | 12/1996 | Fiedler ................... G07F 9/105 |
| | | | 219/521 |
| 6,113,734 A | | 9/2000 | Woo et al. |
| 6,425,300 B1 | * | 7/2002 | Seo ..................... G01M 99/008 |
| | | | 73/865.9 |
| 6,676,407 B2 | | 1/2004 | Largent |
| 7,216,402 B2 | * | 5/2007 | Nishiyama ............. E05B 85/12 |
| | | | 292/336.3 |
| 7,793,600 B2 | | 9/2010 | Dunstan |
| 7,975,351 B2 | | 7/2011 | King |
| 8,225,495 B2 | | 7/2012 | Dehler |
| 8,327,756 B1 | | 12/2012 | Hoffman et al. |
| 8,544,898 B2 | * | 10/2013 | Zimmer ............. E05B 15/0205 |
| | | | 16/85 |
| 8,572,808 B2 | | 11/2013 | Bonomie et al. |
| 8,714,602 B2 | | 5/2014 | Rowbut et al. |
| 10,480,237 B2 | * | 11/2019 | Battlogg ............... F16D 57/002 |
| 10,641,027 B2 | * | 5/2020 | Lee ........................ E05D 11/00 |
| 11,319,743 B2 | * | 5/2022 | Mills ...................... E05F 15/53 |
| 2022/0341212 A1 | * | 10/2022 | Crondahl ............. E05B 1/0053 |
| 2023/0203858 A1 | * | 6/2023 | Audirac ................... E05C 1/04 |
| | | | 292/145 |

FOREIGN PATENT DOCUMENTS

| | | | | |
|---|---|---|---|---|
| DE | 202008014026 U1 | * | 3/2009 | ............... E05F 5/02 |
| GB | 2167121 B | | 5/1986 | |
| WO | WO-2009141044 A1 | * | 11/2009 | ............... E05F 5/02 |
| WO | 2013110939 A1 | | 8/2013 | |

\* cited by examiner

DOOR HANDLE RATE CONTROLLER

FIELD OF THE INVENTION

The invention pertains to door handle rate controllers for dampening movement of door handles, such as handles of board dryer doors.

BACKGROUND OF THE INVENTION

The operation of door handles of board dryers, such as gypsum and veneer dryers poses significant safety risks to operators. Particularly, door handles of existing board dryers are known to release quickly and can be difficult to control, thereby causing danger to the operator as it can strike the operator and cause injury.

There is a need for a door handle rate controller to control the movement of door handles while allowing for easy installation to an existing door assembly. The present invention is directed to rate controllers for door handles, and particularly, door handles of board dryer doors.

SUMMARY

One aspect of the invention provides a door handle rate controller for operatively connecting a damper assembly to a door handle of an existing door assembly such that a movement of the door handle is dampened. The damper assembly may also reduce the angle by which the door handle is opened.

The damper assembly may be any suitable door dampers known in the art. In some embodiments, the damper assembly is a rotary damper. In some embodiments, the damper assembly is a piston and cylinder type damper. In such embodiments, the damper assembly has a piston and a piston rod mounted within a body, such as a cylindrical body, for reciprocal movement in the body along its longitudinal axis containing a damping fluid. The damper assembly extends longitudinally from a damper head to an end of the piston rod.

Means are provided to pivotally couple the end of the piston rod to a first portion of the door handle. The end of the piston rod may be coupled spaced-apart from the first portion of the door handle. Such means may comprise a handle side mount. The handle side mount has a first housing bracket pivotally coupled to the end of the piston rod, and a second housing bracket arranged to pivotally couple to a first portion of the door handle. The handle side mount may be secured to a face of the door.

Means are provided to pivotally couple the damper head to a second portion of the door handle. Such means may comprise a mounting bracket. The mounting bracket may be defined by a first opening arranged to receive the damper head, and a second opening, spaced-apart from the first opening, arranged to receive a second portion of the door handle. The mounting bracket is pivotally coupled to the damper head.

Means may be provided to pivotally couple the damper head to the mounting bracket, and to the end of the piston rod to the first bracket of the handle side mount. Means may also be provided to pivotally couple the first portion of the door handle to the second housing bracket. Such means may include fasteners.

An application of the door handle rate controller is in the field of board drying. The door handle rate controller may be installed on a door handle of a door of a veneer dryer or a gypsum dryer.

Further aspects of the invention and features of specific embodiments of the invention are described below.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
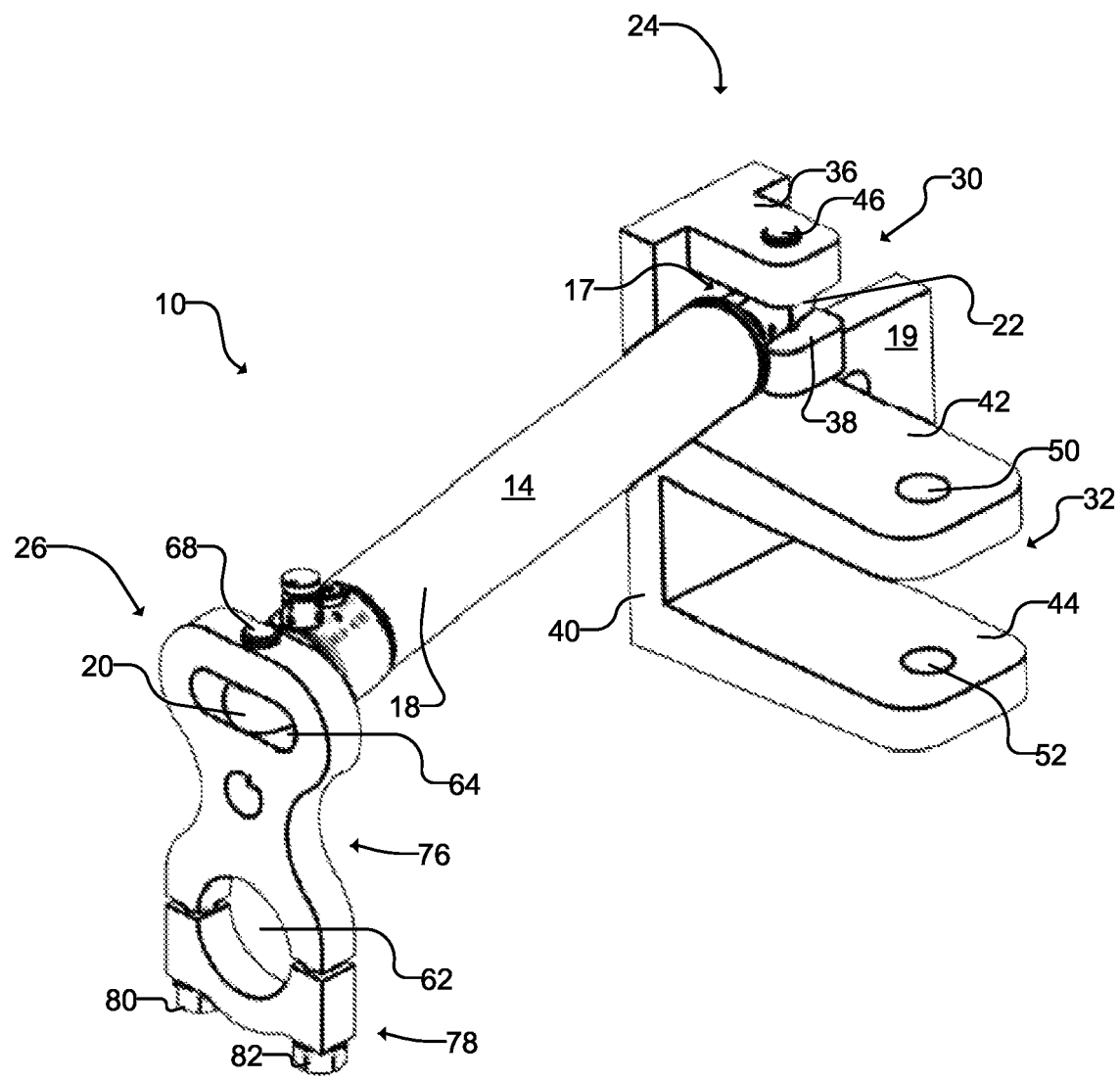
FIG. 1 is a perspective view of a door handle rate controller according to a first example embodiment.

One aspect of the invention provides a door handle rate controller. The door handle rate controller comprises a damper assembly. Any suitable door damper may be used as the damper assembly. The damper assembly is operatively connected to a door handle such that a movement of the door handle is dampened.

FIGS. 1 to 5 illustrate a door handle rate controller 10 for securing a door damper to an existing door assembly, in particular to a door handle of the existing door assembly. The door handle rate controller 10 has a damper assembly 14 for dampening the movement of a handle 29 of a door 16. Door dampers of any suitable type can be used as a damper assembly 14, which the different types that are suitable for use with this invention are well known to a person skilled in the art. Examples of door dampers that have been disclosed in the art include WO 2013/110939 published Aug. 1, 2013, U.S. Pat. No. 7,216,402 published May 15, 2007, and U.S. Pat. No. 7,975,351 published Jul. 12, 2011.

In one embodiment, the damper assembly 14 is a rotary damper. In an example embodiment, the damper assembly 14 is a piston and cylinder type damper. The damper assembly 14 comprises a piston (not shown) and a piston rod 17 mounted within a body 18, e.g., such as a cylindrical body, for reciprocal movement in the body 18 along its longitudinal axis containing a damping fluid. The damper assembly 14 extends longitudinally from a damper head 20 to an end 22 of the piston rod 17.

Means may be provided to pivotally couple an end 22 of the piston rod 17 to a first portion 34 of the door handle 29. Means may be provided to pivotally couple the damper head 20 to a second portion 66 of the door handle 29. FIGS. 1 to 5 illustrate an example embodiment. However, other suitable connecting means may be provided. For example, a first pin or a bolt may be arranged through the end 22 of the piston rod 17 and the first portion 34 of the door handle 29. A second pin or bolt may be arranged through the damper head 20 and the second portion 66 of the door handle 29. The means by which the end 22 of the piston rod 17 is coupled to the first portion 34 of the door handle 29 may be different from the means by which the damper head 20 is coupled to the second portion 66 of the door handle 29.

In an example embodiment, the means for pivotally coupling the end 22 of the piston rod 17 to the first portion 34 of the door handle 29 comprises a handle side mount 24. The handle side mount 24 includes a first 30 and a second 32 housing bracket. The handle side mount 24 may also include a plate 19 projecting outwardly from a base 40 transverse from the housing brackets 30, 32 for securing the handle side mount 24 to the door 16, e.g., on a face of the door 16. The first housing bracket 30 is arranged to pivotally couple to the end 22 of the piston rod, and the second housing bracket 32 is arranged to receive and to pivotally couple to a first portion 34 of the door handle 29.

Figure 6:
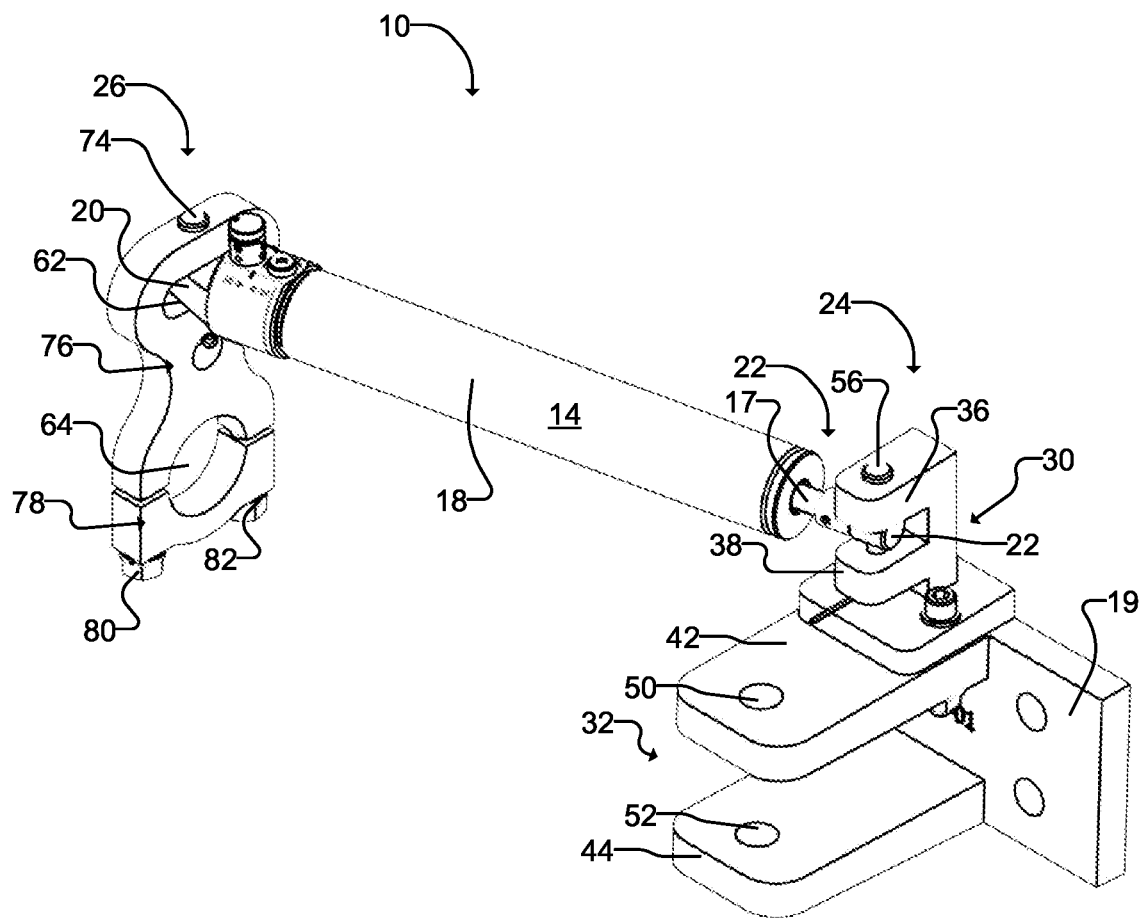
FIG. 6 is a perspective view of a door handle rate controller according to a second example embodiment.

Referring to the FIGS. 1-5 embodiment, the first housing bracket 30 and the second housing bracket 32 are integrally formed. The first housing bracket 30 may comprise a pair of first 36 and second 38 arms extending transversely from a base 40, and arranged parallel to each other, and the second housing bracket 32 may comprise a pair of third 42 and fourth 44 arms extending transversely from the base 40 parallel to the first 36 and second 38 arms. In other embodiments, as shown in FIG. 6, the first 30 and second 32 housing brackets are not integrally formed, in which the first housing bracket 30 is secured to the second housing bracket 32. In such embodiments, only the third 42 and fourth 44 arms of the second housing bracket 32 extend transversely from the base 40.

Each of the arms (first 36, second 38, third 42 and fourth 44 arms) is aligned spaced-apart from each other along a longitudinal axis of the base 40. Each of the pairs of arms 36, 38 and 42, 44 may have equal lengths, i.e., the first 36 and second 38 arms may have equal lengths, and the third 42 and fourth 44 arms may have equal lengths. The first 36 and second 38 arms may have a length shorter than the length of the third 42 and fourth 44 arms.

The first housing bracket 30 may comprise only one arm 36, 38 extending transversely from the base 40. Similarly, the second housing bracket 32 may comprise only one arm 42, 44 extending transversely from the base 40.

Means are provided to pivotally couple the end 22 of the piston rod 17 to the first housing bracket 30. Means may also be provided to pivotally couple the first portion 34 of the door handle 29 to the second housing bracket 32. A first slot 46, second slot 48, third slot 50, and fourth slot 52 is defined in each of the first 36, second 36, third 42 and fourth 44 arms respectively. The first 46 and second 48 slots are aligned with a slot (not shown) defined in the end 22 of the piston rod for receiving an elongated fastener 56 therethrough to pivotally couple the end 22 of the piston rod to the first housing bracket 30. The third 50 and fourth 52 slots are aligned with a slot 58 defined in the first portion 34 of the door handle 29 for receiving an elongated fastener 60 therethrough to pivotally couple the first portion 34 of the door handle 29 to the second housing bracket 32. The slots 46, 48, 50, 52 may be positioned proximate to an end of its respective arm 36, 38, 42, 44 opposite to the end proximate to the base 40. The third 50 and fourth 52 slots may be spaced from the first 46 and second 48 slots along the longitudinal axis of the arms 36, 38, 42, 44. In such embodiments, when secured, the end 22 of the piston rod 17 is spaced from the first portion 34 of the door handle 29 along the longitudinal axis of the arms 36, 38, 42, 44.

The means for pivotally coupling the damper head 20 to a second portion 66 of the door handle 29 may comprise a mounting bracket 26. In the illustrated embodiments, the mounting bracket 26 may be defined by a first opening 62 arranged to receive the damper head 20 and a second opening 64 aligned spaced-apart from the first opening 62 along a longitudinal axis of the mounting bracket 26, arranged to receive a second portion 66 of the door handle 29.

Figure 2:
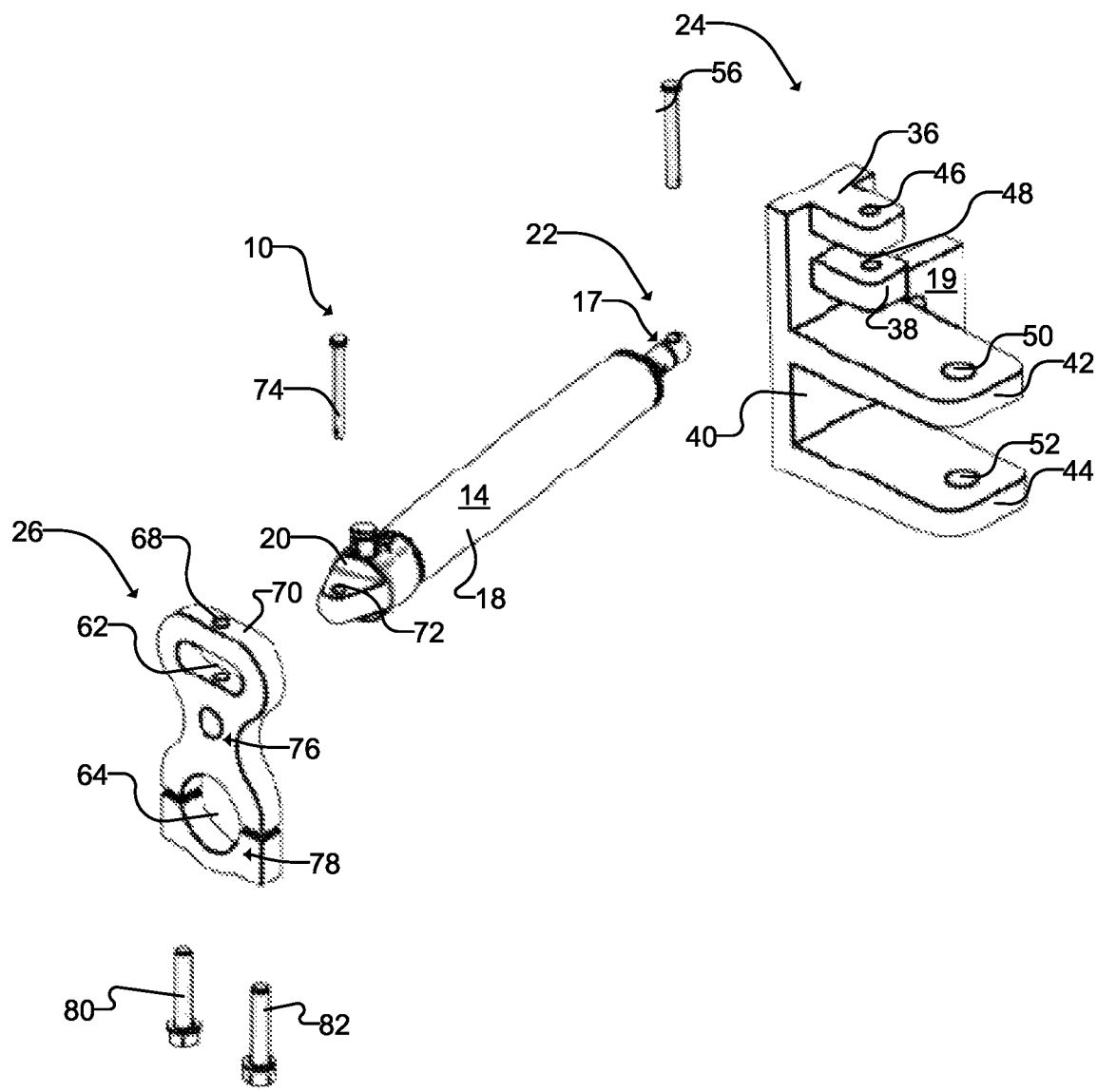
FIG. 2 is an exploded view of the FIG. 1 door handle rate controller.

Means may be provided to couple the damper head 20 to the mounting bracket 26. A bracket slot 68 is defined in the mounting bracket 26 which extends from a top side 70 of the mounting bracket 26 through to the first opening 62, arranged to align with a slot 72 defined in the damper head 20 for receiving a fastener 74 therethrough to couple the damper head 20 to the mounting bracket 26. The second opening 64 is arranged to secure the second portion 66 of the door handle 29. The second opening 64 may have a circular shape, arranged to encircle the second portion 66 of the door handle 29. The mounting bracket 26 may comprise a first component 76 securable to a second component 78 for example by a pair of fasteners 80, 82. The first component 76 is defined by the first opening 62, and the second opening 64 is defined by the attachment of the first component 76 to the second component 78 (as best shown in FIG. 2). The attachment of the first component 76 to the second component 78 forms the second opening 64. The second opening 64 secures the second portion 66 of the door handle 29 within the second opening 64.

Figure 3:
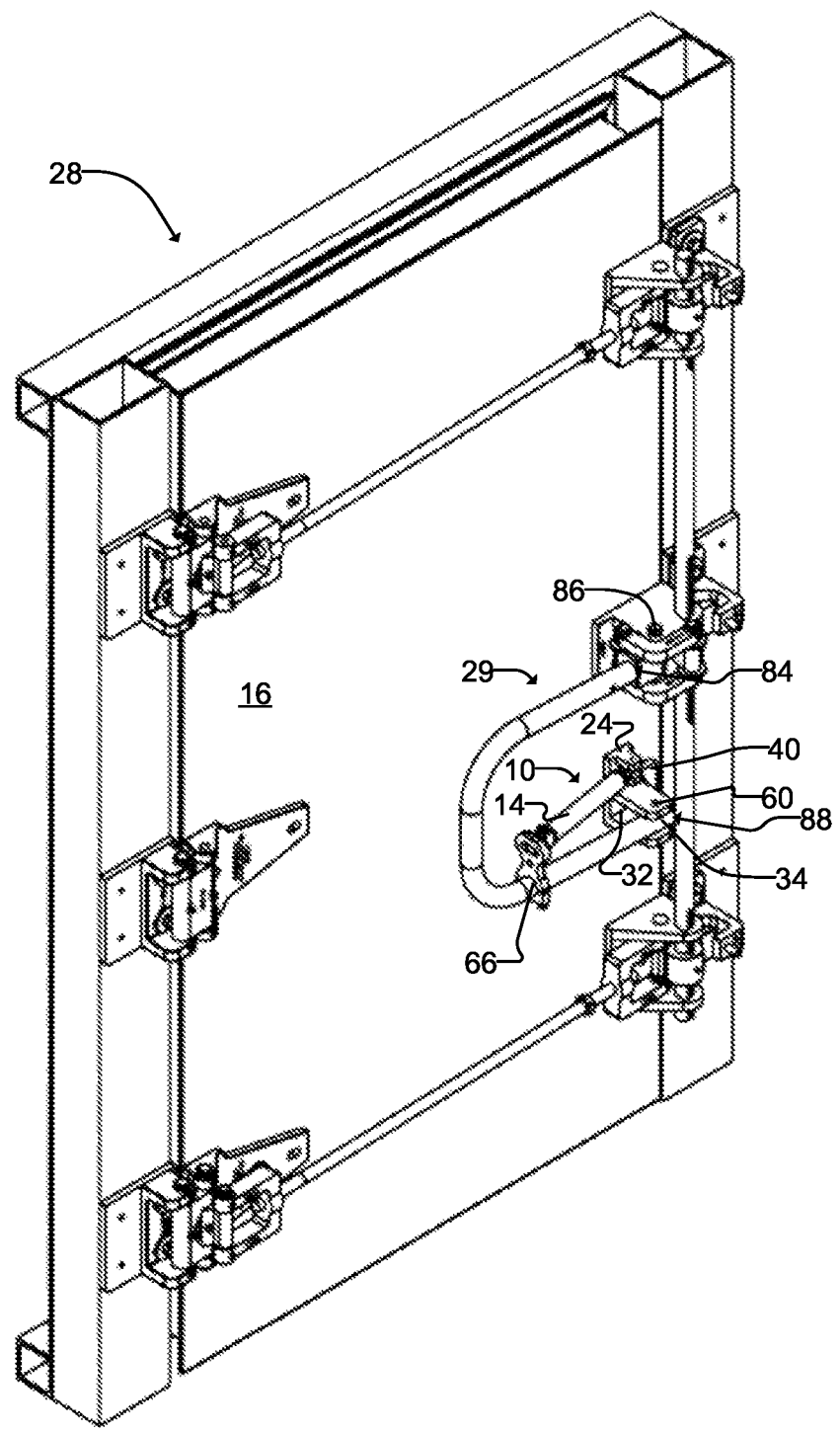
FIG. 3 is a perspective view of the FIG. 1 door handle rate controller installed on a door assembly.
Figure 4:
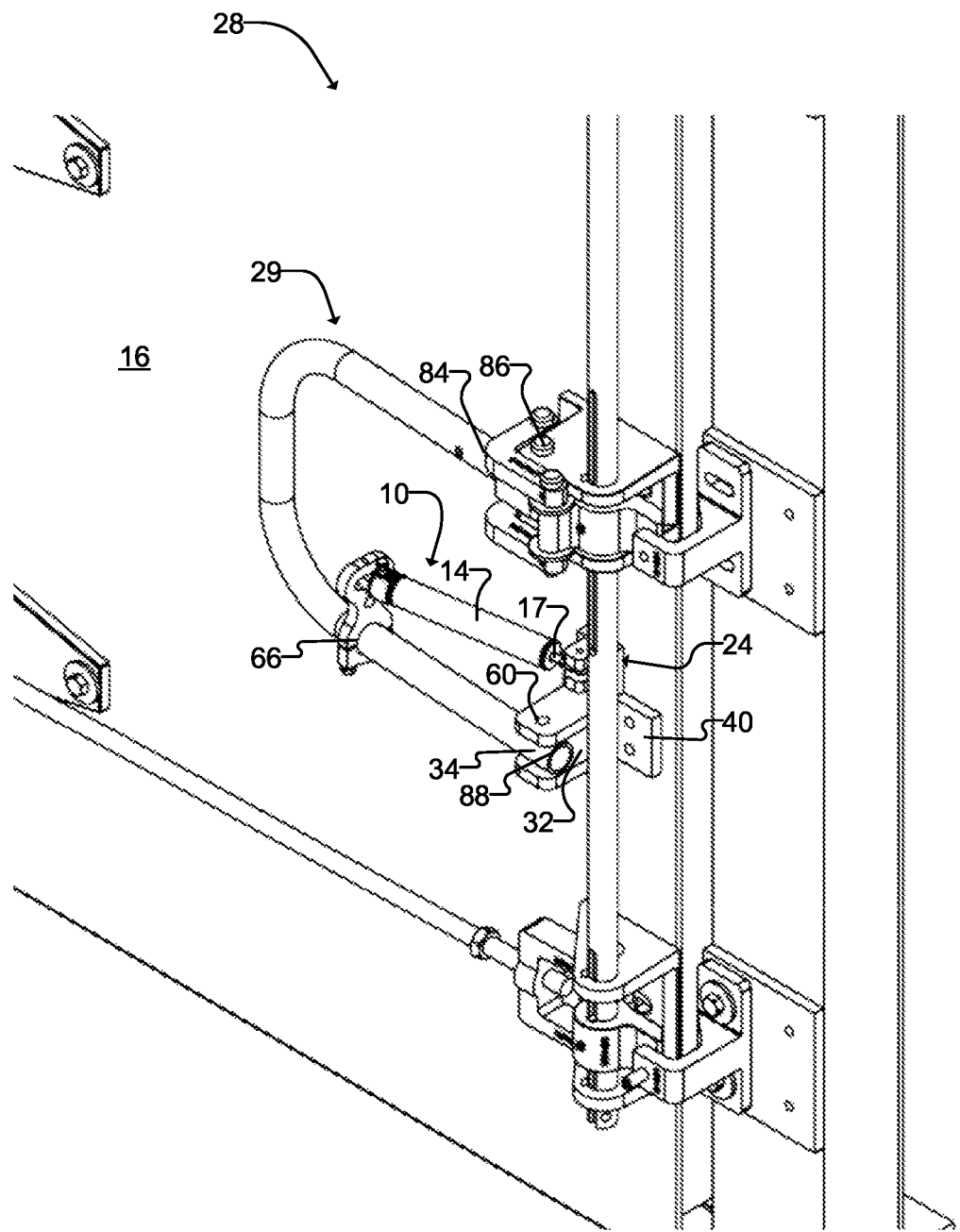
FIG. 4 is a close-up, perspective view of the FIG. 1 door handle rate controller installed on a door assembly with the door handle being in a rest position.
Figure 5:
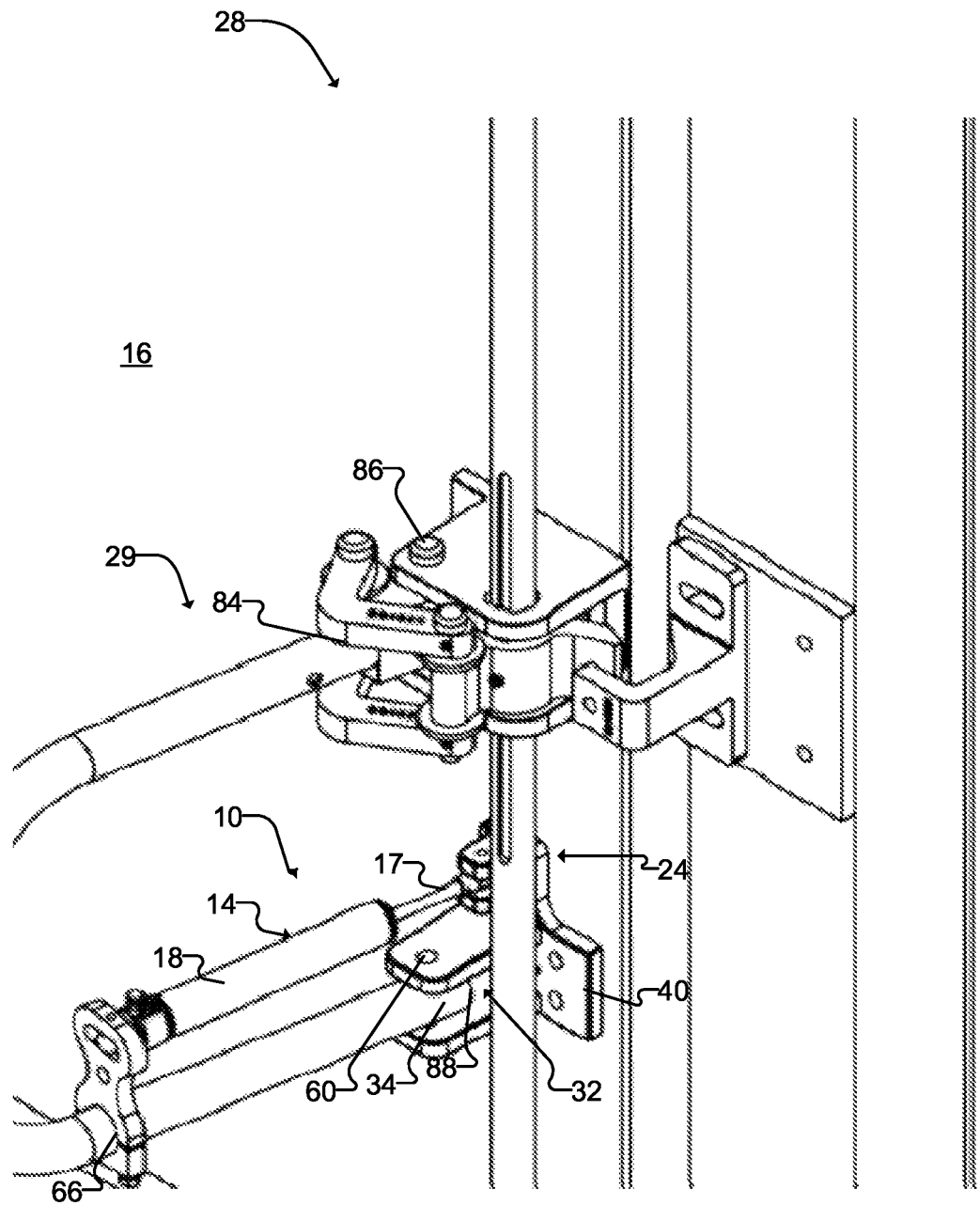
FIG. 5 is a close-up, perspective view of the FIG. 1 door handle rate controller installed on a door assembly with the door handle being in an open position.

The door handle rate controller 10 of the present invention secures a damper assembly to an existing door assembly having a door and a door handle. In an example embodiment, as shown in FIG. 3, the door handle rate controller 10 is installed on an existing door assembly 28 of a board dryer such as a veneer dryer. The door assembly 28 includes a door 16 and a U-shaped door handle 29. One end 84 of the door handle 29 includes a hinge 86 secured to a face of the door 16 arranged for a rotatable movement of the door handle 29 as it is being manipulated by a user to open and close the door 16. The door handle rate controller 10 is installed at the opposing end 88 of the door handle 29, with the first portion 34 of the door handle 29 being proximate to the opposing end 88, and the second portion 66 arranged between the ends 84, 88 of the door handle 29. The base 40 is secured to the face of the door 16 for securing the handle side mount 24 thereon. The door handle rate controller 10 as used in this example embodiment regulates the speed, in particular by reducing the speed, at which the door handle 29 is being opened.

In operation, the damper assembly 14 will normally be in the position seen in FIG. 3, with its piston rod 17 being fully retracted when the door 16 is closed. The pulling of the door handle 29 to open the door 16 by a user rotates the end 84 of the handle about the hinge 86 and pivots the first portion 34 of the door handle 29 about the second housing bracket 32, thereby extending the piston rod 17 along the longitudinal axis of the body 18 of the damper assembly 14 to its extended position (see FIG. 5). A person skilled in the art would readily understand the mechanism by which the reciprocal movement of a piston and piston rod within a cylinder of a typical door damper provides damping resistance, so the details of such mechanism will not be provided herein. The pulling of the door handle 29 activates the movement of the piston and the piston rod 17 within the body 18. This thus regulates the speed at which the piston rod 17 extends from the body 18, and thereby regulates the speed of movement of the door handle 29.

EXAMPLE 1

Figure 7A:
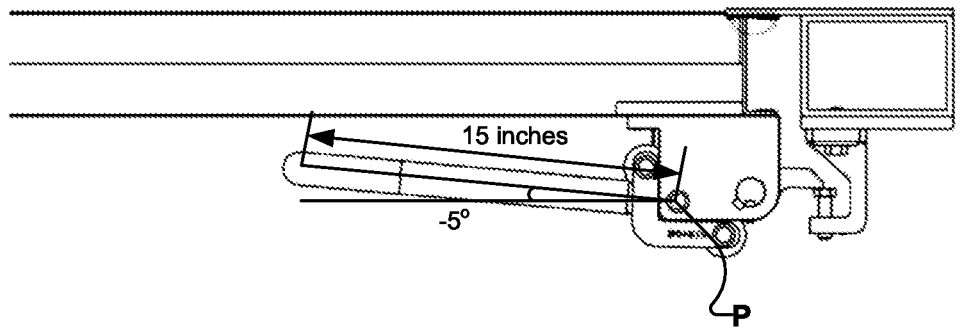
FIG. 7A is a schematic diagram showing a door handle in a rest position, without a door handle rate controller installed thereto.
Figure 7B:
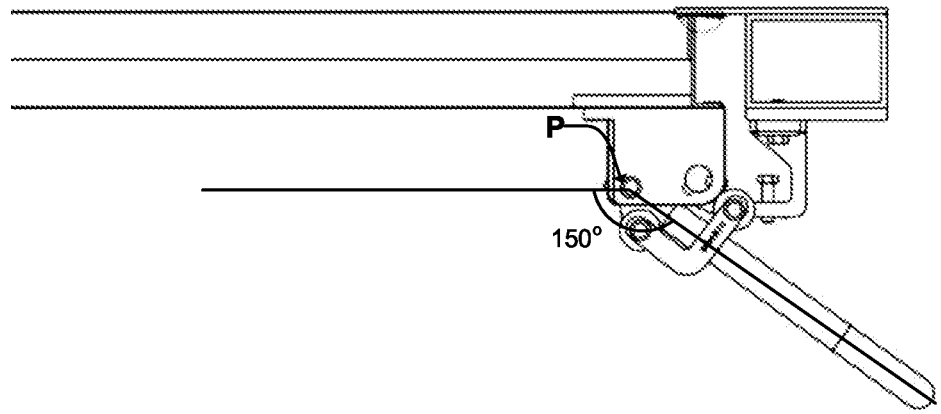
FIG. 7B is a schematic diagram showing the FIG. 7A door handle in a fully opened position.

FIGS. 7A and 7B show schematically an example door handle mounted on a door of a veneer dryer without a door handle rate controller 10 installed thereon, illustrating the door handle in a rest position and a fully opened position respectively. The distance from the pivot point P of the door handle to the terminal end of an elongated handle is 15 inches, and is mounted at an angle of −5° relative to the door at its normal position (i.e., when the handle is in a rest position). At the fully opened position, the door handle is at an angle of 150° relative to the door. As used in normal operations, the amount of time it takes for the door handle to swing from its rest position (in which the door is tightly closed) to its fully opened position is 0.3 seconds. Based on these numbers, the door handle swings open at a speed of about 135 in/s. This is the speed at which the door handle is being opened unattended, i.e., without an operator manipulating the door handle and controlling the movement thereof. The calculation is shown as follows.

$$\text{Rotational speed } \omega = 155° \times \left(\frac{\pi}{180}°\right)\left(\frac{1}{.3s}\right) = 9\frac{\text{rads}}{s}$$

$$\text{Handle end speed } \Omega = 15 \text{ in} \times \left(9\frac{\text{rads}}{s}\right) = 135 \text{ in/s}$$

Figure 8:
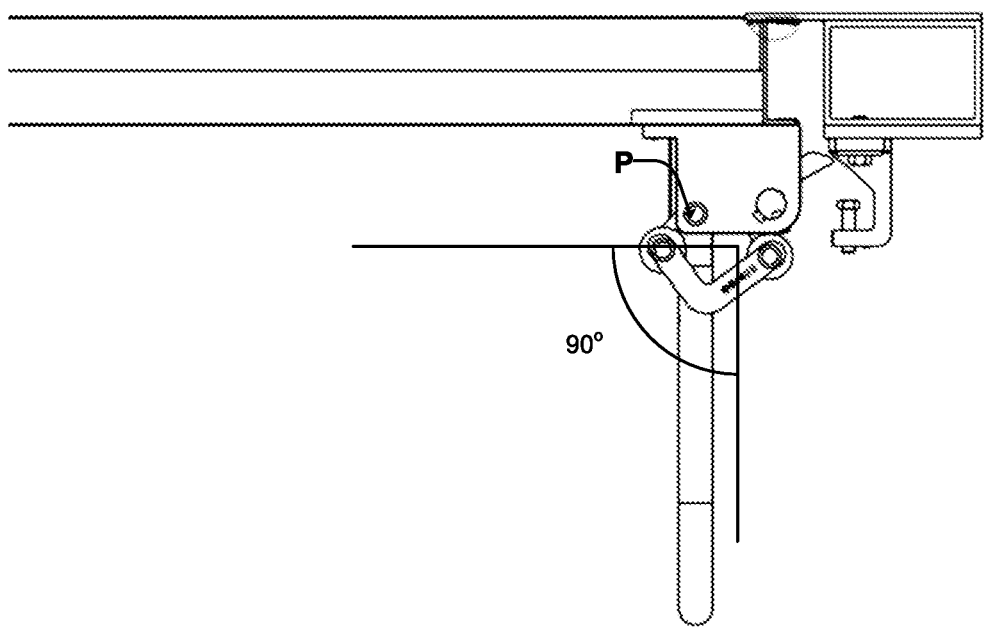
FIG. 8 is a schematic diagram showing a door handle in a fully opened position, with the FIG. 1 or FIG. 6 door handle rate controller installed thereto.

FIG. 8 shows schematically an example door handle mounted on a door of a veneer dryer with a door handle rate controller 10 installed thereon, illustrating the door handle in a fully opened position. The distance from the pivot point P of the handle to the terminal end of an elongated handle is 15 inches, and is mounted at an angle of −5° relative to the door at its normal position. At the fully opened position, the door handle, with the door handle rate controller 10 secured thereto, is at an angle of 90° relative to the door. As used in normal operations, the amount of time it takes for the door handle to swing from its rest position (in which the door is tightly closed) to its fully opened position is 0.8 seconds. Based on these numbers, the door handle, with the door handle rate controller 10 secured thereto, swings open at a speed of about 31 in/s. This is the speed at which the door handle is being opened unattended, i.e., without an operator manipulating the door handle and controlling the movement thereof. The calculation is shown as follows.

$$\text{Controller Rotational speed } \omega = 95° \times \left(\frac{\pi}{180}°\right)\left(\frac{1}{.8s}\right) = 2\frac{\text{rads}}{s}$$

$$\text{Controller Handle end speed } \Omega = 15 \text{ in} \times \left(2\frac{\text{rads}}{s}\right) = 31 \text{ in/s}$$

The comparative data above show that the installation of the door handle rate controller 10 to an existing door assembly is capable of reducing the speed at which a door handle is moved by about 100 in/s. The incorporation of the door handle rate controller to the door handle also advantageously reduces the opening angle of the door handle by about 60°.

Throughout the foregoing description and the drawings, in which corresponding and like parts are identified by the same reference characters, specific details have been set forth in order to provide a more thorough understanding to persons skilled in the art. However, well known elements may not have been shown or described in detail or at all to avoid unnecessarily obscuring the disclosure.

As will be apparent to those skilled in the art in the light of the foregoing disclosure, many alterations and modifications are possible in the practice of this invention without departing from the scope thereof. Accordingly, the description and drawings are to be regarded in an illustrative, rather than a restrictive, sense.

The invention claimed is:

1. A door handle rate controller comprising a damper assembly operatively connected to a door handle, the damper assembly comprising:
   a body;
   a piston and a piston rod arranged for reciprocal movement in the body along a longitudinal axis of the body, wherein the body extends longitudinally from a damper head to an end of the piston rod;
   a handle side mount pivotally coupled to the end of the piston rod, arranged to couple the end of the piston rod to a first portion of the door handle; and
   a mounting bracket pivotally coupled to the damper head, arranged to couple the damper head to a second portion of the door handle,
   wherein pulling of the door handle activates the movement of the piston and the piston rod, thereby dampening a movement of the door handle.

2. The door handle rate controller as defined in claim 1, wherein the handle side mount comprises a first housing bracket pivotally coupled to the end of the piston rod.

3. The door handle rate controller as defined in claim 1, wherein the mounting bracket comprises a first opening arranged to receive the damper head.

4. The door handle rate controller as defined in claim 2, wherein the handle side mount further comprises a second housing bracket arranged to receive the first portion of the door handle.

5. The door handle rate controller as defined in claim 3, wherein the mounting bracket further comprises a second opening, spaced-apart from the first opening, arranged to secure to the second portion of the door handle.

6. The door handle rate controller as defined in claim 4, wherein the handle side mount further comprises a plate extending transversely from the first and second housing brackets arranged to secure the handle side mount to the door.

7. The door handle rate controller as defined in claim 4, wherein the first and second housing brackets are integrally formed.

8. The door handle rate controller as defined in claim 4, wherein the first housing bracket is coupled to the second housing bracket.

9. The door handle rate controller as defined in claim 4, wherein the first housing bracket comprises a pair of first and second arms transversely extending from a base of the handle side mount, and the second housing bracket comprises a pair of third and fourth arms transversely extending from the base parallel to and spaced-apart from the first and second arms.

10. The door handle rate controller as defined in claim 3, further comprising means for pivotally coupling the end of the piston rod to the first housing bracket and means for pivotally coupling the damper head to the first opening.

11. The door handle rate controller as defined in claim 9, wherein a first, second, third, and fourth slot are arranged to receive a respective fastener therethrough, the first, second, third and fourth slots are defined in the first, second, third and fourth arms of the first and second housing brackets.

12. The door handle rate controller as defined in claim 11, wherein the first, second, third and fourth slots are positioned proximate to respective ends of the first, second, third and fourth arms, opposite to the ends secured to the base.

13. The door handle rate controller as defined in claim 12, wherein the first and second slots are spaced from the third and fourth slots along a longitudinal axis of the arms.

14. The door handle rate controller as defined in claim 11, wherein the first and second slots are in alignment with a corresponding slot defined in the end of the piston rod for receiving a fastener therethrough.

15. The door handle rate controller as defined in claim 3, wherein the mounting bracket comprises a first component securable to a second component.

16. The door handle rate controller as defined in claim 5, wherein a shape of the second opening is circular.

17. The door handle rate controller as defined in claim 11, wherein the third and fourth slots of the second housing bracket are arranged to align with a corresponding slot defined in the first portion of the door handle, wherein the slots are aligned to receive a fastener therethrough.

18. The door handle rate controller as defined in claim 5, wherein the second opening of the mounting bracket is dimensioned to encircle the door handle at the second portion.

* * * * *